United States Patent
Inoue et al.

(10) Patent No.: US 11,934,195 B2
(45) Date of Patent: Mar. 19, 2024

(54) CHARGING CONTROL SYSTEM, CHARGING STATION, AUTONOMOUS TRAVELING WORK MACHINE, AND CHARGING CONTROL SYSTEM CONTROL METHOD

(71) Applicant: HONDA MOTOR CO., LTD., Tokyo (JP)

(72) Inventors: Toshio Inoue, Wako (JP); Toshiaki Kawakami, Wako (JP); Takuya Kanisawa, Wako (JP); Takumi Shiiyama, Wako (JP); Jin Nishimura, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 256 days.

(21) Appl. No.: 17/440,381

(22) PCT Filed: Mar. 22, 2019

(86) PCT No.: PCT/JP2019/012116
§ 371 (c)(1),
(2) Date: Sep. 17, 2021

(87) PCT Pub. No.: WO2020/194383
PCT Pub. Date: Oct. 1, 2020

(65) Prior Publication Data
US 2022/0155792 A1 May 19, 2022

(51) Int. Cl.
*G05D 1/02* (2020.01)
*A01D 34/00* (2006.01)
(Continued)

(52) U.S. Cl.
CPC ......... *G05D 1/0225* (2013.01); *A01D 34/008* (2013.01); *H02J 7/0044* (2013.01);
(Continued)

(58) Field of Classification Search
CPC ......... G05D 1/0225; G05D 2201/0208; A01D 34/008; A01D 2101/00; H02J 7/0044; H02J 7/0049; H02J 7/0071; H02J 7/00716
See application file for complete search history.

(56) References Cited

U.S. PATENT DOCUMENTS

| 5,650,710 A | 7/1997 | Hotta |
| 11,172,609 B2 * | 11/2021 | Hahn ..................... B60L 50/66 |

(Continued)

FOREIGN PATENT DOCUMENTS

JP  2017-010161  1/2017

OTHER PUBLICATIONS

European Search Report dated Mar. 10, 2022, 9 pages.
(Continued)

*Primary Examiner* — Kira Nguyen
(74) *Attorney, Agent, or Firm* — Rankin, Hill & Clark LLP

(57) ABSTRACT

A charging control system includes a lawn mower that includes a battery and performs a lawn mowing work while traveling autonomously, and a charging station for charging the battery. The lawn mower includes a superimposing unit for superimposing, on a charging current, a current indicating period information for defining a shutoff period of supply power to be supplied from the charging station. The charging station includes a current detector for detecting the charging current, an information acquisition unit for acquiring period information based on a detection result of the current detector, a switch for shutting off the supply power, and a shutoff controller for controlling the operation of the (Continued)

switch. The shutoff controller releases the shutoff of supply of power to the lawn mower based on the period information acquired by the information acquisition unit. Therefore, the power consumption of the lawn mower can be reduced.

14 Claims, 9 Drawing Sheets

(51) Int. Cl.
    *G05D 1/00*     (2006.01)
    *G05D 22/02*     (2006.01)
    *H02J 7/00*     (2006.01)
    *A01D 101/00*     (2006.01)

(52) U.S. Cl.
    CPC .......... *H02J 7/0049* (2020.01); *H02J 7/0071* (2020.01); *H02J 7/00716* (2020.01); *A01D 2101/00* (2013.01); *G05D 2201/0208* (2013.01)

(56) References Cited

U.S. PATENT DOCUMENTS

| | | | |
|---|---|---|---|
| 2005/0010330 A1* | 1/2005 | Abramson | G05D 1/0272 318/568.12 |
| 2011/0234153 A1* | 9/2011 | Abramson | B60L 53/51 901/1 |
| 2015/0198952 A1* | 7/2015 | Einecke | A01D 34/008 15/300.1 |
| 2016/0366813 A1* | 12/2016 | Haneda | G05D 1/0265 |
| 2017/0020064 A1* | 1/2017 | Doughty | A01G 25/09 |
| 2019/0230850 A1* | 8/2019 | Johnson | G05D 1/0088 |

OTHER PUBLICATIONS

Japanese Office Action dated Apr. 19, 2022, English translation included, 5 pages.
International Preliminary Report on Patentability, dated Oct. 7, 2021, 6 pages.
Japanese Office Action from corresponding Application No. JP 2021-508366, dated Oct. 25, 2022, 5 pages.
International Search Report, dated Jun. 18, 2019, 1 page.

* cited by examiner

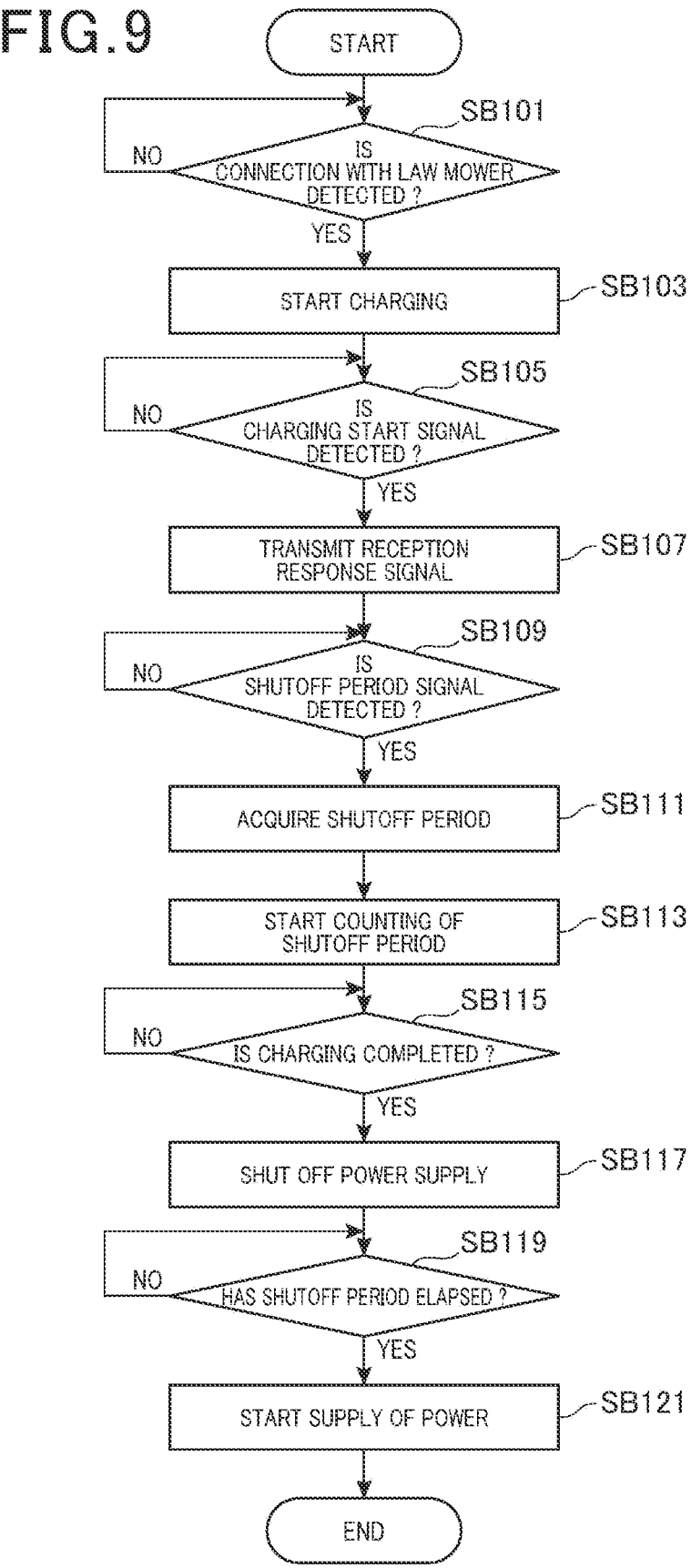

CHARGING CONTROL SYSTEM, CHARGING STATION, AUTONOMOUS TRAVELING WORK MACHINE, AND CHARGING CONTROL SYSTEM CONTROL METHOD

TECHNICAL FIELD

The present invention relates to a charging control system, a charging station, an autonomous traveling work machine and a charging control system control method.

BACKGROUND ART

A lawn mower that autonomously travels in a lawn area and cuts lawn grass is known as one of autonomous traveling work machines that work while autonomously traveling (for example, see Patent Literature 1).

A lawn mower described in Patent Literature 1 is driven by a battery, and the battery is connected to a charging station to be charged.

CITATION LIST

Patent Literature

[Patent Literature 1]
JP 2017-10161 A

SUMMARY OF THE INVENTION

Technical Problem

However, the lawn mower described in Patent Literature 1 has room for reducing power consumption.

In the lawn mower, for example, even when the battery has been fully charged, the battery is connected to the charging station, which may cause power to be consumed.

The present invention has an object to provide a charging control system, a charging station, an autonomous traveling work machine, and a charging control system control method, which are capable of reducing power consumption.

Solution to Problem

According to an aspect of the present invention, a charging control system comprises an autonomous traveling work machine that includes a battery and performs predetermined work while traveling autonomously, and a charging station for charging the battery, wherein the autonomous traveling work machine comprises a superimposing unit by which a current indicating period information for defining a shutoff period of supply power to be supplied from the charging station is superimposed on a charging current, and wherein the charging station comprises a current detector for detecting the charging current, an information acquisition unit for acquiring the period information based on a detection result of the current detector, a shutoff unit for shutting off the supply power, and a shutoff controller for controlling an operation of the shutoff unit, the shutoff controller releasing the shutoff of the supply power based on the period information acquired by the information acquisition unit.

According to another aspect of the present invention, in the above charging control system, the autonomous traveling work machine includes a calculator for calculating the shutoff period based on a current time and a date and time when the predetermined work is started.

According to yet another aspect of the present invention, in the above charging control system, the autonomous traveling work machine comprises a first calculator for calculating, based on a remaining amount of the battery, a charging time required until charging of the battery is completed, and a second calculator for calculating the shutoff period based on the charging time and a date and time when the predetermined work is started.

According to yet another aspect of the present invention, in the above charging control system, the superimposing unit superimposes the current indicating the period information on the charging current with at least one of a current value, a pulse width, and a number of pulses of the charging current.

According to yet another aspect of the present invention, in the above charging control system, the autonomous traveling work machine comprises a regulation controller for regulating the current value of the charging current, and the superimposing unit causes the regulation controller to regulate the current value of the charging current, thereby superimposing the current indicating the period information on the charging current with at least one of the current value, the pulse width, and the number of pulses of the charging current.

According to yet another aspect of the present invention, in the above charging control system, when the charging of the battery has been completed, the shutoff controller shuts off the supply power.

According to yet another aspect of the present invention, in the above charging control system, when the shutoff period has elapsed, the shutoff controller releases the shutoff of the supply power.

According to yet another aspect of the present invention, in the above charging control system, the autonomous traveling work machine includes a transition unit for causing the autonomous traveling work machine to transition from a normal state to a power saving state when charging of the battery has been completed.

According to yet another aspect of the present invention, in the above charging control system, when the shutoff period has elapsed, the transition unit causes the autonomous traveling work machine to transition from the power saving state to the normal state.

According to yet another aspect of the present invention, in the above charging control system, the autonomous traveling work machine includes an internal power supply circuit for generating operating power for the autonomous traveling work machine based on power stored in the battery, and the transition unit shuts off power supply from the battery to the internal power supply circuit when charging of the battery has been completed.

According to yet another aspect of the present invention, in the above charging control system, the charging control system is configured to be capable of supplying power from the charging station to the internal power supply circuit, and during a period when supply of power from the battery is shut off, when supply of power from the charging station to the internal power supply circuit is started, the internal power supply circuit generates power for operating the transition unit with power supplied from the charging station.

According to yet another aspect of the present invention, a charging station for charging a battery of an autonomous traveling work machine that performs predetermined work while traveling autonomously comprises a current detector for detecting a charging current on which a signal indicating period information for defining a shutoff period of supply power to be supplied to the autonomous traveling work machine is superimposed by the autonomous traveling work machine, an information acquisition unit for acquiring the period information based on a detection result of the current detector, a shutoff unit for shutting off the supply power, and a shutoff controller for controlling an operation of the shutoff unit, wherein the shutoff controller releases the shutoff of the supply power based on the period information acquired by the information acquisition unit.

According to yet another aspect of the present invention, an autonomous traveling work machine that includes a battery and performs predetermined work while traveling autonomously comprises a superimposing unit by which a signal indicating period information for defining a shutoff period of supply power to be supplied from a charging station is superimposed on a charging current, wherein the charging station detects the charging current, acquires the period information based on a detection result of the charging current, and releases shutoff of the supply power based on the period information.

According to yet another aspect of the present invention, a charging control system control method for a charging control system including an autonomous traveling work machine that includes a battery and performs predetermined work while traveling autonomously, and a charging station for charging the battery, comprises a superimposing step in which the autonomous traveling work machine superimposes, on a charging current, a signal indicating period information for defining a shutoff period of supply power to be supplied from the charging station, a current detection step in which the charging station detects the charging current, an information acquisition step in which the charging station acquires the period information based on a detection result in the current detection step, a shutoff step in which the charging station shuts off the supply power, and a release step in which the charging station releases shutoff of the supply power based on the period information acquired in the information acquisition step.

Advantageous Effect of Invention

According to the aspects of the present invention, power consumption can be reduced.

BRIEF DESCRIPTION OF DRAWINGS

FIG. 9 is a flowchart showing an example of processing of the second controller.

DESCRIPTION OF EMBODIMENT

An embodiment will be described hereinafter with reference to the drawings.

1. Configuration of Unmanned Lawn Mowing System

[1-1. Overall Configuration of Unmanned Lawn Mowing System]

Figure 1:
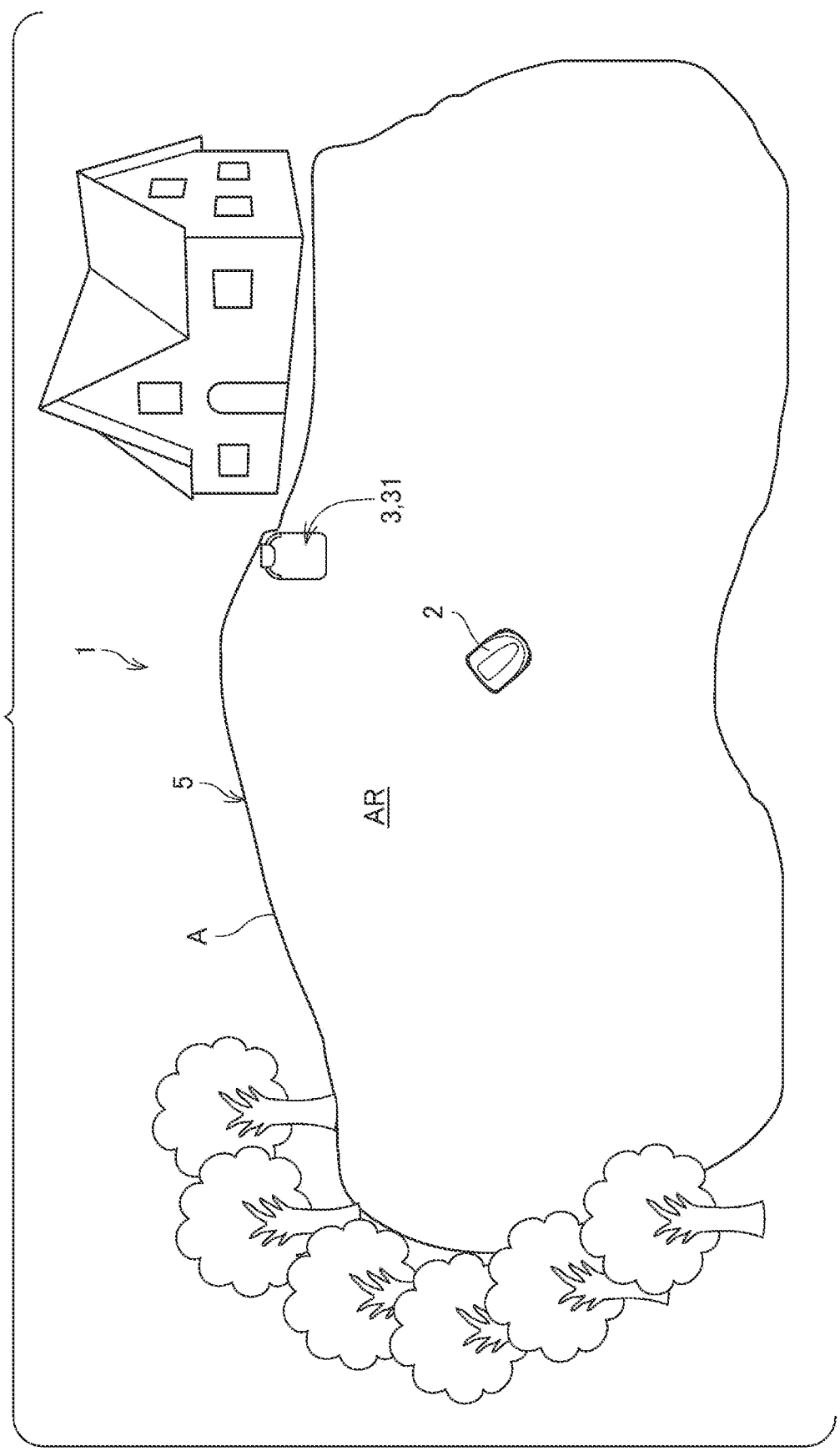
FIG. 1 is a diagram showing an example of a configuration of an unmanned lawn mowing system according to an embodiment of the present invention.

FIG. 1 is a diagram showing a configuration of an unmanned lawn mowing system 1 according to an embodiment.

An unmanned lawn mowing system 1 includes a robot lawn mower 2, an area wire 5 for defining a lawn mowing area AR that is a target to be subjected to a lawn mowing work, and a charging station 3.

The robot lawn mower 2 is an autonomous traveling type work machine that mows lawn grass while autonomously performs unmanned traveling in the lawn mowing area AR. The area wire 5 is a member to be laid along a boundary A by a trader or the like so as to enable the robot lawn mower 2 to detect the boundary A of the lawn mowing area AR. In the present embodiment, the laid area wire 5 is magnetized, and the robot lawn mower 2 detects the boundary A of the lawn mowing area AR by detecting the magnetism of the area wire 5. The robot lawn mower 2 corresponds to an example of "autonomous traveling work machine".

The charging station 3 includes a control board 31 for charging the robot lawn mower 2, and is installed inside the lawn mowing area AR. The control board 31 will be described in detail with reference to FIG. 4. The charging station 3 is also a standby place for the robot lawn mower 2 under a non-working condition. The robot lawn mower 2 is configured to return to the charging station 3 by autonomous traveling when a lawn mowing work has been finished, and receive charging appropriately at the charging station 3.

[1-2. Configuration of Robot Lawn Mower]

Figure 2:
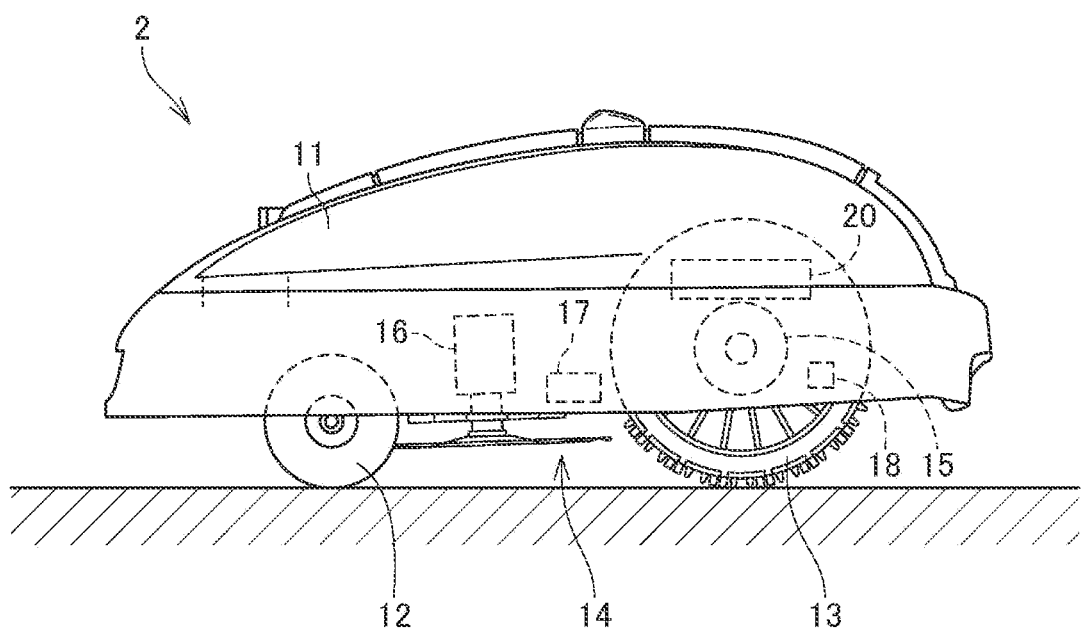
FIG. 2 is a side view showing an example of a configuration of an autonomous traveling work machine.

FIG. 2 is a side view showing an example of a configuration of the robot lawn mower 2 according to the present embodiment.

The robot lawn mower 2 may be referred to as the lawn mower 2 in the following description.

The lawn mower 2 includes a housing 11, right and left front wheels 12 provided at a front portion of the housing 11, right and left rear wheels 13 provided at a rear portion of the housing 11, and a working unit 14 provided at a center lower portion of the housing 11. The working unit 14 is a cutting blade disc provided with a cutting blade, and can cut grass by rotating the cutting blade disc.

The lawn mower 2 includes right and left traveling motors 15, a working unit driving motor 16, a battery 17, a wheel speed sensor 18, and a first controller 20. The housing 11 accommodates the right and left traveling motors 15, the working unit driving motor 16, the battery 17, the wheel speed sensor 18, and the first controller 20.

The respective right and left traveling motors 15 individually drive the right and left rear wheels 13, respectively. The traveling motors 15 drive the rear wheels 13 in accordance with an instruction from the first controller 20, whereby the lawn mower 2 travels. The working unit driving motor 16 drives the working unit 14. The working unit driving motor 16 drives the working unit 14 in accordance with an instruction from the first controller 20, whereby the lawn mowing work is performed. The battery 17 supplies operating power to each unit of the lawn mower 2. The wheel speed sensor 18 detects the rotational speed of the right and left rear wheels 13 serving as driving wheels. A detection signal of the wheel speed sensor 18 is transmitted to the first controller 20.

The first controller 20 controls the operation of each unit of the lawn mower 2. The first controller 20 includes, for example, a processor such as a central processing unit (CPU), and a memory such as a random access memory (RAM) or a read only memory (ROM). Data such as map data related to a working target area, and control program are stored in the memory. The first controller 20 will be described in detail with reference to FIGS. 4 and 5.

[1-3. Configuration of Charging Control System]

Figure 3:
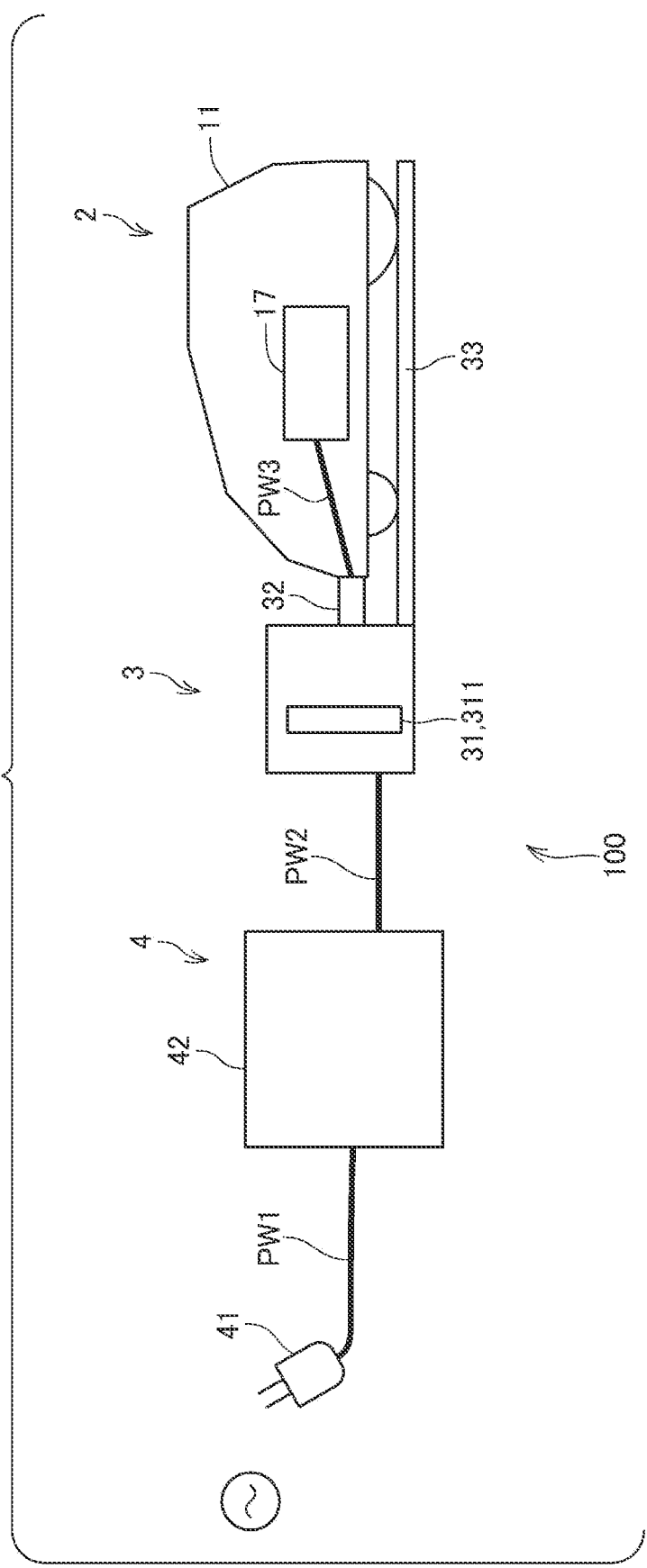
FIG. 3 is a diagram showing an example of a power supply path for a battery.

FIG. 3 is a diagram showing an example of a power supply path of the battery 17 in a charging control system 100.

The charging control system 100 includes a conversion device 4, a charging station 3, and a robot lawn mower 2. The charging control system 100 controls charging of the battery 17 of the robot lawn mower 2.

As shown in FIG. 3, power supplied from a commercial power supply is supplied to the battery 17 via the conversion device 4 and the charging station 3.

The conversion device 4 includes a connection plug 41 and an AC/DC adapter 42. The connection plug 41 is connected to the commercial power supply. The AC/DC adapter 42 converts an AC voltage supplied from the commercial power supply into a DC voltage. The connection plug 41 and the AC/DC adapter 42 are connected to each other by a power wire PW1.

The charging station 3 includes a control board 31, a connection unit 32, and a mount table 33. A second controller 311 is mounted on the control board 31. The second controller 311 controls the operation of the charging station 3. The second controller 311 includes, for example, a processor such as CPU and a memory such as RAM or ROM. Data such as a control program are stored in the memory. The second controller 311 will be described in detail with reference to FIGS. 4 and 5. The conversion device 4 and the charging station 3 are connected to each other by a power wire PW2.

The connection unit 32 connects the charging station 3 and the lawn mower 2 so that energization is possible therebetween. The lawn mower 2 is placed on the mount table 33. The connection unit 32 is configured to connect the charging station 3 and the lawn mower 2 so that energization is possible between the charging station 3 and the lawn mower 2 when the lawn mower 2 is placed on the mount table 33. That is, when the lawn mower 2 is placed on the mount table 33, power can be supplied from the charging station 3 to the lawn mower 2. When the lawn mower 2 is placed on the mount table 33, the connection unit 32 and the battery 17 are connected to each other by a power wire PW3. In other words, when the lawn mower 2 is placed on the mount table 33, power can be supplied from the charging station 3 to the battery 17.

Figure 4:
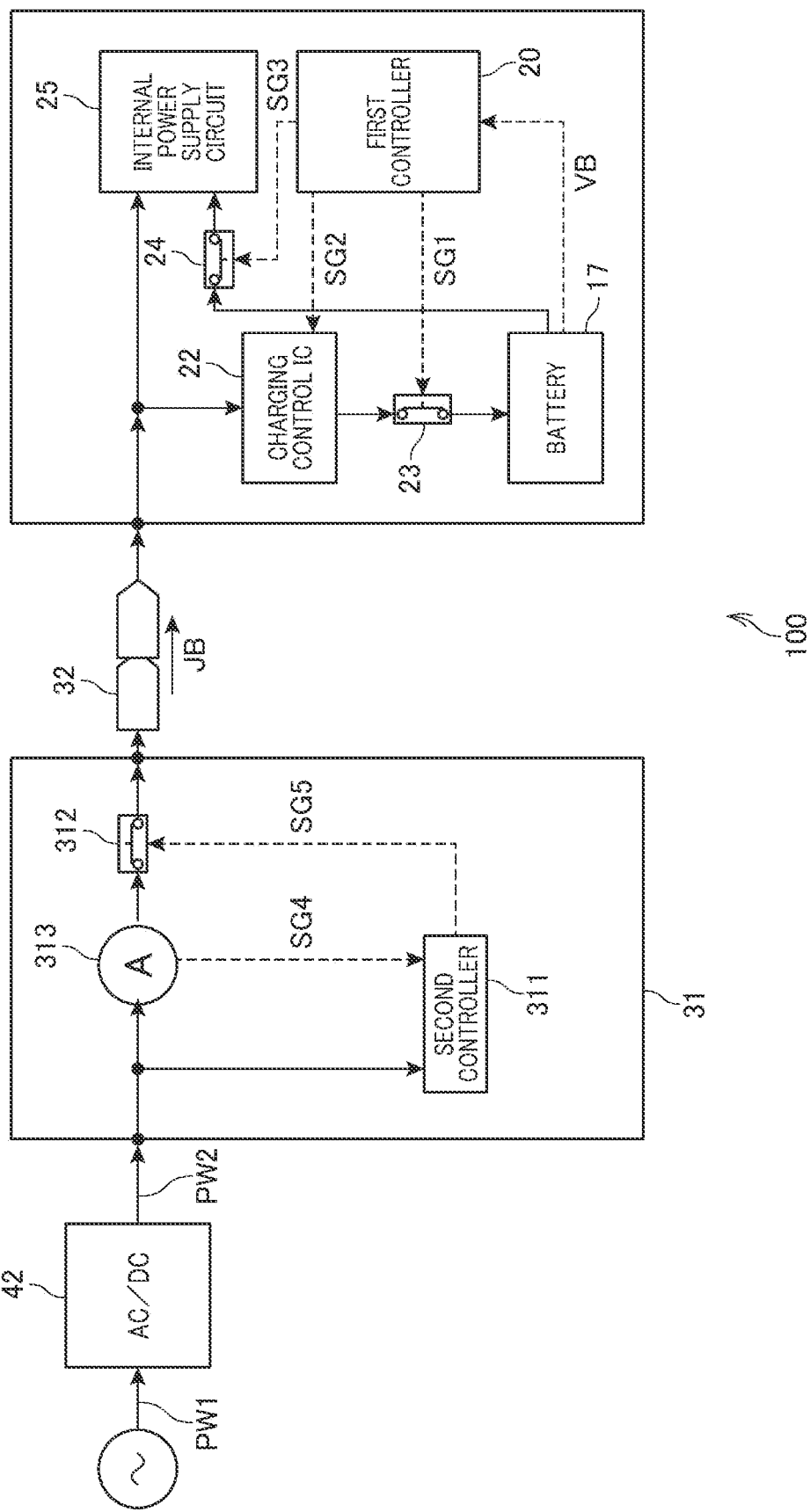
FIG. 4 is a diagram showing an example of a configuration of a charging control system.

FIG. 4 is a diagram showing an example of a configuration of the charging control system 100. In FIG. 4, a path for supplying power is indicated by a solid line, and a path for transmitting a signal is indicated by broken lines.

The second controller 311, a third switch 312, and a current detection circuit 313 are mounted on the control board 31 of the charging station 3.

A current detection circuit 313 is arranged between the AC/DC adapter 42 and the connection unit 32. The current detection circuit 313 detects a current value of a charging current JB supplied from the AC/DC adapter 42 to the battery 17. A fourth signal SG4 indicating the current value detected by the current detection circuit 313 is transmitted to the second controller 311.

The third switch 312 is arranged between the current detection circuit 313 and the connection unit 32. The third switch 312 is switched between ON and OFF according to a fifth signal SG5 from the second controller 311. When the third switch 312 is set to ON, power is allowed to be supplied from the charging station 3 to the lawn mower 2. The third switch 312 corresponds to an example of a "shutoff unit".

The lawn mower 2 includes a first controller 20, a charging control IC (Integrated Circuit) 22, a first switch 23, a second switch 24, and an internal power supply circuit 25.

The charging control IC 22 is arranged between the connection unit 32 and the battery 17. The charging control IC 22 regulates the charging current JB according to a second signal SG2 from the first controller 20. The charging current JB indicates a current to be supplied from the charging station 3 to the battery 17 during charging.

The first switch 23 is arranged between the charging control IC 22 and the battery 17. The first switch 23 is switched between ON and OFF according to a first signal SG1 from the first controller 20. When the third switch 312 is set to ON and the first switch 23 is set to ON, power is allowed to be supplied from the charging station 3 to the battery 17. In other words, the battery 17 can be charged.

The second switch 24 is arranged between the battery 17 and the internal power supply circuit 25. The second switch 24 is switched between ON and OFF in accordance with a third signal SG3 from the first controller 20. When the second switch 24 is set to ON, power is allowed to be supplied from the battery 17 to the internal power supply circuit 25. In this case, electric power can be supplied from the internal power supply circuit 25 to each unit of the lawn mower 2.

The internal power supply circuit 25 is connected to the connection unit 32 and is connected to the battery 17 via the second switch 24. When the second switch 24 is set to ON, power is supplied from the battery 17 to the internal power supply circuit 25 via the second switch 24.

The internal power supply circuit 25 supplies power to each unit of the lawn mower 2. For example, the internal power supply circuit 25 supplies a DC voltage of 3 V to the first controller 20. Further, for example, the internal power supply circuit 25 supplies a DC voltage of 5V to the charging control IC 22. In other words, the internal power supply circuit 25 generates DC voltages having a plurality of voltage values from the DC voltage supplied from the battery 17, and supplies each unit of the lawn mower 2 with a DC voltage having a voltage value suitable for the operation of each unit. Further, since the internal power supply circuit 25 is connected to the connection unit 32, power is supplied from the charging station 3 to the internal power supply circuit 25 when the third switch 312 is set to ON. The internal power supply circuit 25 will be further described with reference to FIG. 5.

[1-4. Configurations of First Controller and Second Controller]

Figure 5:
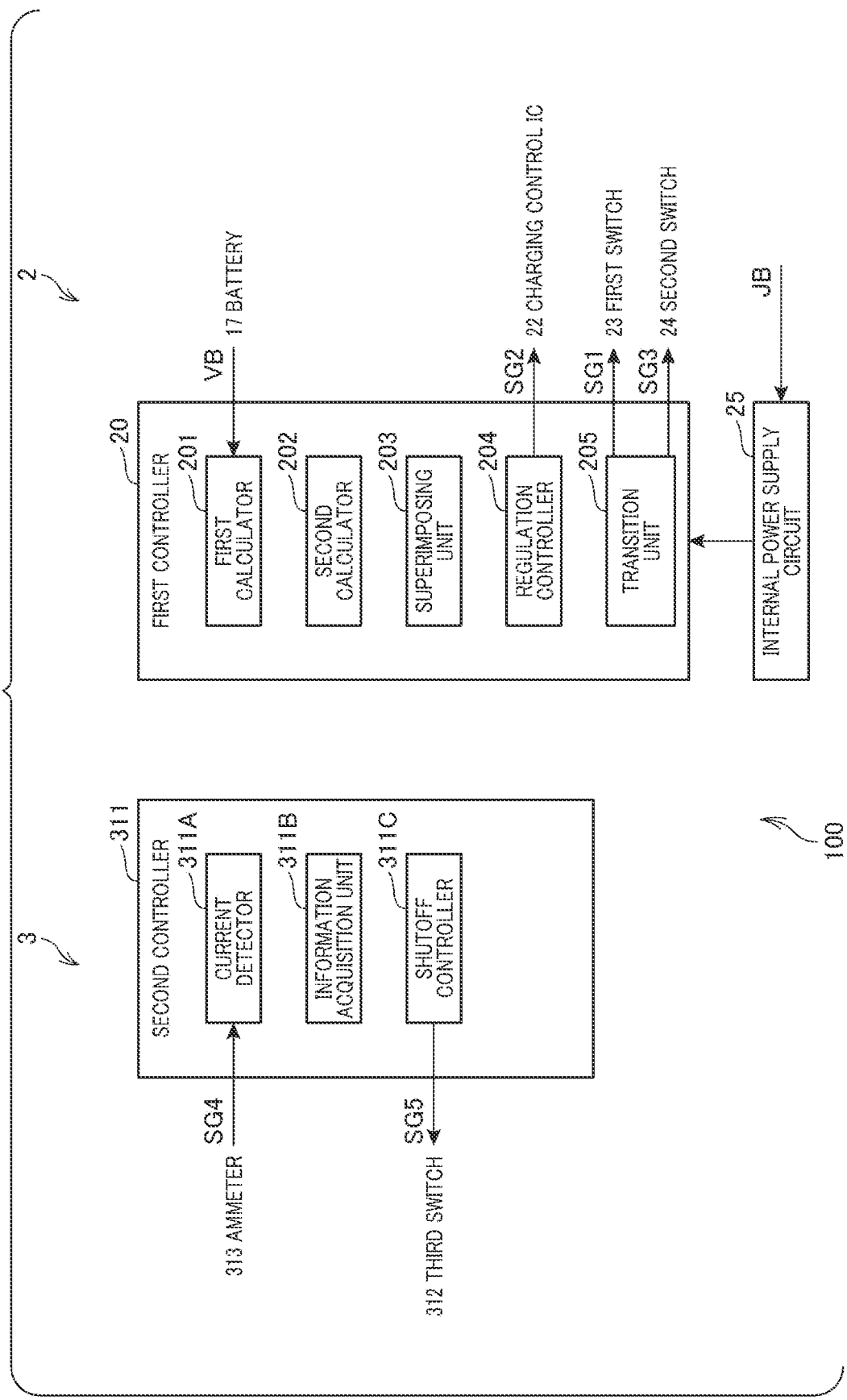
FIG. 5 is a diagram showing an example of a configuration of a first controller and an example of a configuration of a second controller.

FIG. 5 is a diagram showing an example of the configuration of the first controller 20 and the configuration of the second controller 311.

The first controller 20 includes a first calculator 201, a second calculator 202, a superimposing unit 203, a regulation controller 204, and a transition unit 205. Specifically, the processor of the first controller 20 executes a control program stored in the memory to function as the first calculator 201, the second calculator 202, the superimposing unit 203, the regulation controller 204, and the transition unit 205.

The second controller 311 includes a current detector 311A, an information acquisition unit 311B, and a shutoff controller 311C. Specifically, the processor of the second controller 311 executes a control program stored in the memory, whereby the second controller 311 functions as the current detector 311A, the information acquisition unit 311B, and the shutoff controller 311C.

The first calculator 201 calculates a charging time TF required to complete charging of the battery 17 based on a residual amount QR of the battery 17. For example, the first calculator 201 detects the battery voltage VB of the battery 17, and calculates the residual amount QR of the battery 17 based on the battery voltage VB. Then, the first calculator 201 calculates a charging time TF required to complete charging of the battery 17 based on the residual amount QR of the battery 17.

In the present embodiment, the first calculator 201 detects the battery voltage VB and calculates the residual amount QR of the battery 17 based on the battery voltage VB, but the present invention is not limited to this mode. The first calculator 201 may calculate the residual amount QR of the battery 17. For example, the first calculator 201 may calculate the residual amount QR of the battery 17 based on the charging current JB.

The second calculator 202 calculates a shutoff period PC based on a charging time TF and a date and time when a lawn mowing work is started. The shutoff period PC defines a period during which supply power PS is shutoff. Specifically, the shutoff period PC indicates a period from a charging start time point until the date and time when the lawn mowing work is started. In other words, the shutoff period PC indicates a period from the charging start time point until the time point when the shutoff of the supply power PS is released. The lawn mowing work corresponds to an example of "predetermined work". The date and time when the lawn mowing work is started is stored in the memory of the first controller 20 in advance. The "supply power PS" indicates the power to be supplied from the charging station 3 to the lawn mower 2.

The superimposing unit 203 superimposes the current JA indicating the period information DP on the charging current JB with at least one of the current value, the pulse width, and the number of pulses of the charging current JB. The period information DP defines a shutoff period PC of the supply power PS.

Specifically, the superimposing unit 203 causes the regulation controller 204 to regulate the current value of the charging current JB, thereby superimposing the current JA indicating the period information DP on the charging current JB with at least one of the current value, the pulse width, and the number of pulses of the charging current JB.

For example, the superimposing unit 203 causes the regulation controller 204 to regulate the current value of the charging current JB, thereby superimposing the current JA indicating the period information DP on the charging current JB with the number of pulses of the charging current JB. An example of the charging current JB on which the current JA indicating the period information DP is superimposed will be described in detail with reference to FIG. 6.

In the present embodiment, the superimposing unit 203 causes the regulation controller 204 to regulate the current value of the charging current JB, thereby superimposing the current JA indicating the period information DP on the charging current JB with the number of pulses of the charging current JB. However, the invention is not limited to this manner. The superimposing unit 203 may cause the regulation controller 204 to regulate the current value of the charging current JB, thereby superimposing the current JA indicating the period information DP on the charging current JB with at least one of the current value, the pulse width, and the number of pulses of the charging current JB.

The regulation controller 204 regulates the current value of the charging current JB. Specifically, the regulation controller 204 transmits a second signal SG2 instructing the charging control IC to regulate the current value of the charging current JB. The charging control IC regulates the current value of the charging current JB according to an instruction based on the second signal SG2 from the regulation controller 204. Specifically, the charging control IC reduces the current value of the charging current JB to a current value less than the current value of a normal charging current JB. "The current value of the normal charging current JB" indicates the current value of the charging current JB when the regulation controller 204 does not regulate the current value of the charging current JB.

The transition unit 205 causes the lawn mower 2 to transition from a normal state to a power saving state when the charging of the battery 17 has been completed. In addition, the transition unit 205 causes the lawn mower 2 to transition from the power saving state to the normal state when the shutoff period PC has elapsed.

Note that the "normal state" indicates a state in which the lawn mower 2 can execute the lawn mowing work. For example, the "normal state" indicates a state in which power is supplied from the battery 17 to the internal power supply circuit 25 and power is supplied from the internal power supply circuit 25 to each unit of the lawn mower 2.

The "power saving state" indicates a state in which power to be consumed by the lawn mower 2 is less than that in the "normal state". For example, the "power saving state" indicates a state where no power is supplied from the charging station 3 to the battery 17 and no power is supplied from the battery 17 to the internal power supply circuit 25. In this case, no power is supplied from the internal power supply circuit 25 to each unit of the lawn mower 2. In the present embodiment, the "power saving state" is a so-called shutdown state.

Specifically, when charging of the battery 17 has been completed, the transition unit 205 transmits the first signal SG1 instructing execution of "OFF" to the first switch 23. The first switch 23 is set to OFF according to the instruction based on the first signal SG1 from the transition unit 205. When the first switch 23 is set to OFF, power supply from the charging station 3 to the battery 17 is interrupted.

When the charging of the battery 17 has been completed, the transition unit 205 transmits a third signal SG3 instructing execution of "OFF" to the second switch 24. The second switch 24 is set to OFF according to the instruction based on the third signal SG3 from the transition unit 205. The second switch 24 is set to OFF, whereby power supply from the battery 17 to the internal power supply circuit 25 is interrupted.

When the shutoff period PC has elapsed, the transition unit 205 transmits the third signal SG3 instructing execution of "ON" to the second switch 24. The second switch 24 is set to ON according to the instruction based on the third signal SG3 from the transition unit 205. Since the second switch 24 is set to ON, power is supplied from the battery 17 to the internal power supply circuit 25.

When the shutoff period PC has elapsed, the transition unit 205 transmits the first signal SG1 instructing execution of "ON" to the first switch 23. The first switch 23 is set to ON according to the instruction based on the first signal SG1 from the transition unit 205.

The current detector 311A detects the charging current JB. Specifically, the current detector 311A detects the current value of the charging current JB based on the fourth signal SG4 from the current detection circuit 313. The fourth signal SG4 indicates the current value of the charging current JB.

The information acquisition unit 311B acquires the period information DP based on a detection result of the current detector 311A. The period information DP defines a shutoff period PC of the supply power PS.

For example, when the superimposing unit 203 causes the regulation controller 204 to regulate the current value of the charging current JB, thereby superimposing the current JA indicating the period information DP on the charging current JB with the number of pulses of the charging current JB, the information acquisition unit 311B acquires the period information DP as follows. In other words, the information acquisition unit 311B acquires the number of pulses of the charging current JB as he period information DP based on the detection result of the current detector 311A.

The shutoff controller 311C shuts off the supply power PS supplied from the charging station 3 to the lawn mower 2 when the charging of the battery 17 has been completed. Specifically, the shutoff controller 311C determines based on a detection result of current detector 311A whether the charging of the battery 17 has been completed. More specifically, the shutoff controller 311C determines that the charging of the battery 17 has been completed when the current value of the charging current JB is equal to or less than a threshold value.

Further, when it is determined that the charging of the battery 17 has been completed, the shutoff controller 311C transmits a fifth signal SG5 instructing execution of "OFF" to the third switch 312. The third switch 312 is set to OFF according to the instruction based on the fifth signal SG5 from the shutoff controller 311C. Since the third switch 312 is set to OFF, the supply power PS supplied from the charging station 3 to the lawn mower 2 is shut off. As a result, the supply of power from the charging station 3 to the internal power supply circuit 25 is shut off.

Further, the shutoff controller 311C releases the shutoff of the supply power PS supplied from the charging station 3 to the lawn mower 2 based on the period information DP acquired by the information acquisition unit 311B. Specifically, the shutoff controller 311C determines whether the shutoff period PC indicated by the period information DP has elapsed. When it is determined that the shutoff period PC has elapsed, the shutoff controller 311C transmits the fifth signal SG5 instructing execution of "ON" to the third switch 312. The third switch 312 is set to ON according to the instruction based on the fifth signal SG5 from the shutoff controller 311C. Since the third switch 312 is set to ON, the shutoff of the supply power PS supplied from the charging station 3 to the lawn mower 2 is released. In other words, the supply power PS is supplied from the charging station 3 to the lawn mower 2. As a result, power is supplied from the charging station 3 to the internal power supply circuit 25.

When the supply of power from the charging station 3 to the internal power supply circuit 25 is started during the period when the supply of power from the battery 17 is shut off, the internal power supply circuit 25 generates power for causing the transition unit 205 to operate from the power supplied from the charging station 3.

Specifically, when charging of the battery 17 has been completed and the shutoff period PC has elapsed, the internal power supply circuit 25 generates power for causing the first controller 20 to operate from the power supplied from the charging station 3, and supplies the power to the first controller 20.

In other words, when the charging of the battery 17 has been completed, the second switch 24 is set to OFF according to an instruction of the transition unit 205. When the shutoff period PC has elapsed, the third switch 312 is set to ON according to an instruction from the shutoff controller 311C. Therefore, when the charging of the battery 17 has been completed and the shutoff period PC has elapsed, the supply of power from the charging station 3 to the internal power supply circuit 25 is started during the period when the supply of power from the battery 17 is shut off.

In this way, when the power supply from the charging station 3 to the internal power supply circuit 25 is started, the internal power supply circuit 25 generates power for causing the transition unit 205 to operate from the power supplied from the charging station 3, so that the transition unit 205 is allowed to operate. The transition unit 205 causes the lawn mower 2 to transition from the power saving state to the normal state when the shutoff period PC has elapsed. As a result, the lawn mower 2 is allowed to perform a lawn mowing work.

2. Specific Example of Charging Current

Figure 6:
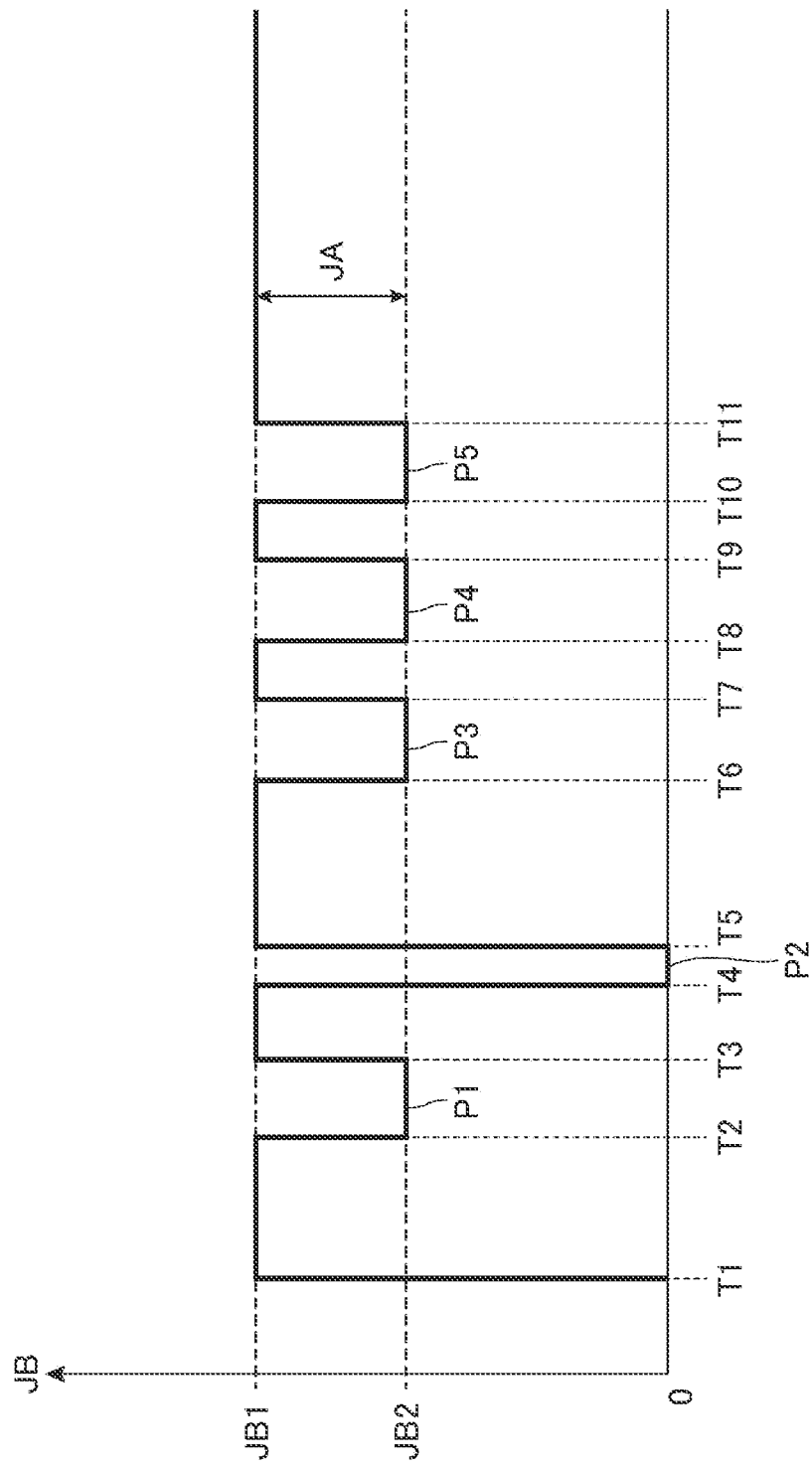
FIG. 6 is a diagram showing an example of a charging current.

FIG. 6 is a diagram showing an example of the charging current JB on which the current JA indicating the period information DP is superimposed. In the present embodiment, a case where the current JA indicating the period information DP is superimposed on the charging current JB with the number of pulses of the charging current JB will be described.

The horizontal axis of FIG. 6 indicates a time T, and the vertical axis of FIG. 6 indicates the current value of the charging current JB.

At a time point T1, the lawn mower 2 is placed on the mount table 33, and the connection unit 32 connects the charging station 3 and the lawn mower 2 so that energization is possible therebetween. As a result, the charging current JB changes from zero to a first current value JB1, and charging of the battery 17 is started. The first current value JB1 indicates the current value of the charging current JB when the regulation controller 204 does not regulate the current value of the charging current JB.

Next, at a time point T2, the regulation controller 204 regulates the current value of the charging current JB. As a result, the charging current JB changes from the first current value JB1 to a second current value JB2. The second current value JB2 is smaller than the first current value JB1 by only the current value of the current JA. The second current value JB2 indicates the current value of the charging current JB when the regulation controller 204 regulates the current value of the charging current JB.

Next, at a time point T3, the regulation controller 204 releases the regulation of the current value of the charging current JB. As a result, the charging current JB changes from the second current value JB2 to the first current value JB1. In this way, the superimposing unit 203 causes the regulation controller 204 to regulate the current value of the charging current JB, thereby superimposing a first pulse P1 on the charging current JB.

The first pulse P1 indicates that the first controller 20 starts transmission of the period information DP to the second controller 311. The first pulse P1 corresponds to an example of a "charging start signal". The "charging start signal" is a signal indicating that charging has started. Further, the "charging start signal" is a signal for notifying the second controller 311 that a shutoff period signal is transmitted.

Next, at a time point T4, the second controller 311 generates a second pulse P2 indicating that the first pulse P1 has been detected. Specifically, the second controller 311 transmits a fifth signal SG5 instructing execution of OFF to the third switch 312, thereby setting the third switch 312 to OFF. As a result, the charging current JB is equal to zero.

Next, at a time point T5, the second controller 311 transmits a fifth signal SG5 instructing execution of ON to the third switch 312, thereby setting the third switch 312 to ON. As a result, the charging current JB is equal to the first current value JB1. In this way, the information acquisition unit 311B generates the second pulse P2.

The second pulse P2 corresponds to an example of "reception response signal". The "reception response signal" is a signal indicating that the second controller 311 has received the charging start signal.

Next, from a time point T6 to a time point T11, the superimposing unit 203 causes the regulation controller 204 to regulate the current value of the charging current JB, thereby superimposing the current JA indicating the period information DP on the charging current JB with the number of pulses of the charging current JB.

Specifically, at the time point T6, the regulation controller 204 regulates the current value of the charging current JB. As a result, the charging current JB changes from the first current value JB1 to the second current value JB2.

Next, at the time point T7, the regulation controller 204 releases the regulation of the current value of the charging current JB. As a result, the charging current JB changes from the second current value JB2 to the first current value JB1. In this way, the superimposing unit 203 generates a third pulse P3.

Next, at a time point T8, the regulation controller 204 regulates the current value of the charging current JB. As a result, the charging current JB changes from the first current value JB1 to the second current value JB2.

Next, at a time point T9, the regulation controller 204 releases the regulation of the current value of the charging current JB. As a result, the charging current JB changes from the second current value JB2 to the first current value JB1. In this way, the superimposing unit 203 generates a fourth pulse P4.

Next, at a time point T10, the regulation controller 204 regulates the current value of the charging current JB. As a result, the charging current JB changes from the first current value JB1 to the second current value JB2.

Next, at a time point T11, the regulation controller 204 releases the regulation of the current value of the charging current JB. As a result, the charging current JB changes from the second current value JB2 to the first current value JB1. In this way, the superimposing unit 203 generates a fifth pulse P5.

The third pulse P3 to the fifth pulse P5 indicate the period information DP. In other words, the number of pulses of the charging current JB is "3". For example, the superimposing unit 203 determines the number of pulses of the charging current JB according to the shutoff period PC indicated by the period information DP. For example, one pulse indicates 2 hours. In this case, the third pulse P3 to the fifth pulse P5 indicate that the shutoff period PC is 6 hours (=2 hours×3). The third pulse P3 to the fifth pulse P5 correspond to an example of the "shutoff period signal". The "shutoff period signal" is a signal indicating the shutoff period PC.

3. Specific Example of Operation of Switch

Figure 7:
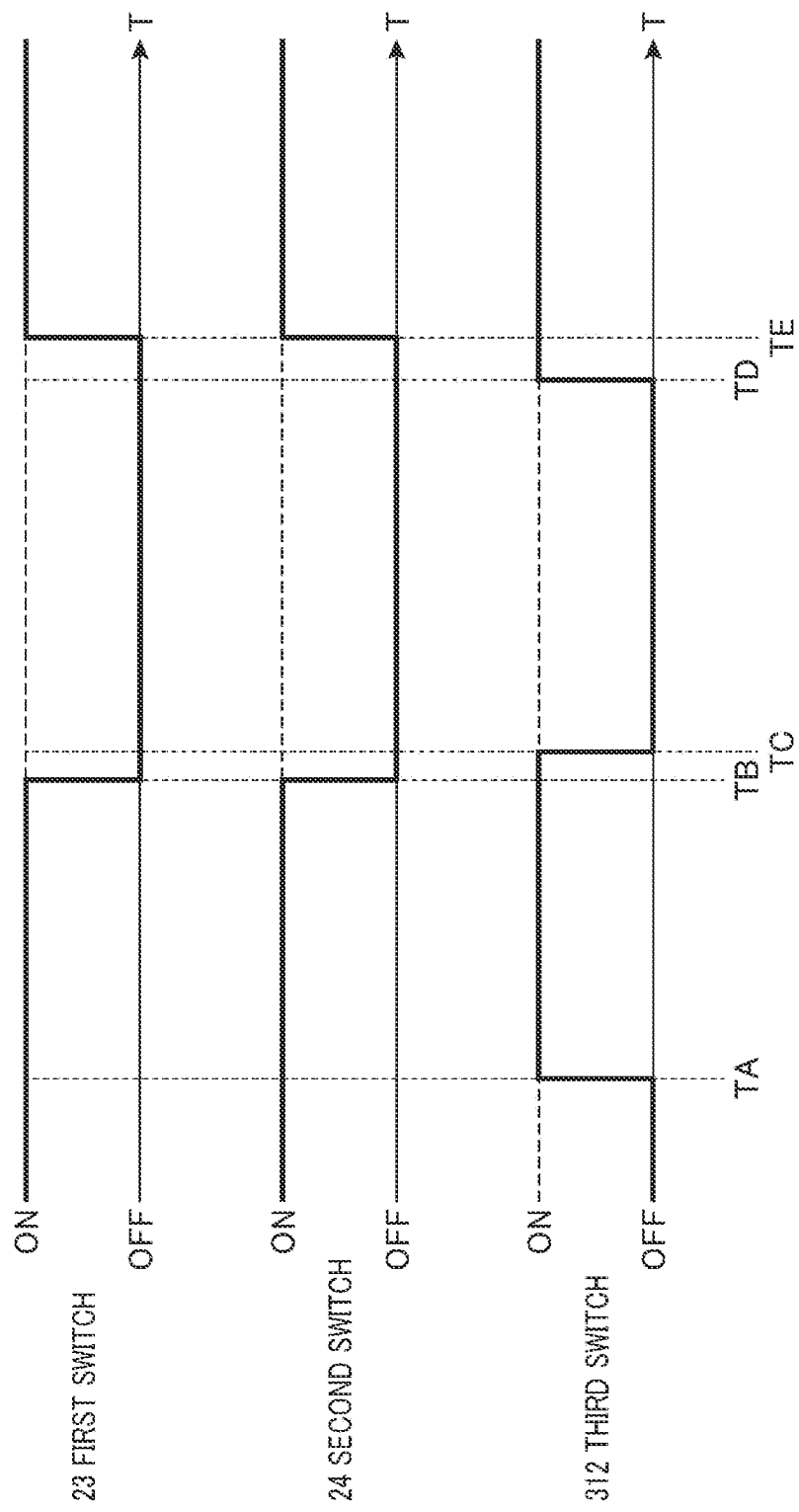
FIG. 7 is a timing chart showing an example of an operation of a switch.

FIG. 7 is a timing chart showing an example of operations of the first switch 23, the second switch 24, and the third switch 312.

In FIG. 7, the timing chart of the first switch 23 is shown at an upper portion, the timing chart of the second switch 24 is shown at a center portion, and the timing chart of the third switch 312 is shown at a lower portion. The horizontal axis of each timing chart represents time T, and the vertical axis represents whether the switch is set to ON or OFF.

First, at a time point TA, the lawn mower 2 is placed on the mount table 33, and the connection unit 32 connects the charging station 3 and the lawn mower 2 so that energization is possible therebetween. When the second controller 311 detects that the charging station 3 and the lawn mower 2 are connected to each other so that energization is possible therebetween, the second controller 311 transmits the fifth signal SG5 instructing execution of "ON" to the third switch 312. The third switch 312 is set to ON according to the instruction based on the fifth signal SG5 from the second controller 311. The third switch 312 is set to ON, whereby charging of the battery 17 is started.

Next, at a time point TB, the transition unit 205 determines that the charging of the battery 17 has been completed, and causes the lawn mower 2 to transition from the normal state to the power saving state.
Specifically, the transition unit 205 transmits the first signal SG1 instructing execution of "OFF" the first switch 23. The first switch 23 is set to OFF according to the instruction based on the first signal SG1 from the transition unit 205. The first switch 23 is set to OFF, whereby supply of power from the charging station 3 to the battery 17 is shut off.

Further, at the time point TB, the transition unit 205 transmits the third signal SG3 instructing execution of "OFF" to the second switch 24. The second switch 24 is set to OFF according to the instruction based on the third signal SG3 from the transition unit 205. The second switch 24 is set to OFF, whereby power supply from the battery 17 to the internal power supply circuit 25 is shut off.

Next, at a time point TC, the shutoff controller 311C determines that the charging of the battery 17 has been completed, and transmits the fifth signal SG5 instructing execution of "OFF" to the third switch 312. The third switch 312 is set to OFF according to the instruction based on the fifth signal SG5 from the shutoff controller 311C. The third switch 312 is set to OFF, whereby supply power PS supplied from the charging station 3 to the lawn mower 2 is shut off.

Next, at a time point TD, the shutoff controller 311C determines that the shutoff period PC has elapsed, and transmits the fifth signal SG5 instructing execution of "ON" to the third switch 312. The third switch 312 is set to ON according to the instruction based on the fifth signal SG5 from the shutoff controller 311C. The third switch 312 is set to ON, whereby the shutoff of the supply power PS supplied from the charging station 3 to the lawn mower 2 is released. In other words, the supply power PS is supplied from the charging station 3 to the lawn mower 2.

Next, at a time point TE, the transition unit 205 determines that the shutoff period PC has elapsed, and transmits the first signal SG1 instructing execution of "ON" to the first switch 23. The first switch 23 is set to ON according to the instruction based on the first signal SG1 from the transition unit 205. The first switch 23 is set to ON, whereby power is supplied from the charging station 3 to the battery 17.

Further, the transition unit 205 transmits the third signal SG3 instructing execution of "ON" to the second switch 24.

The second switch 24 is set to ON according to the instruction based on the third signal SG3 from the transition unit 205. The second switch 24 is set to ON, whereby power is supplied from the battery 17 to the internal power supply circuit 25.

4. Processing of the First Controller and the Second Controller

Figure 8:
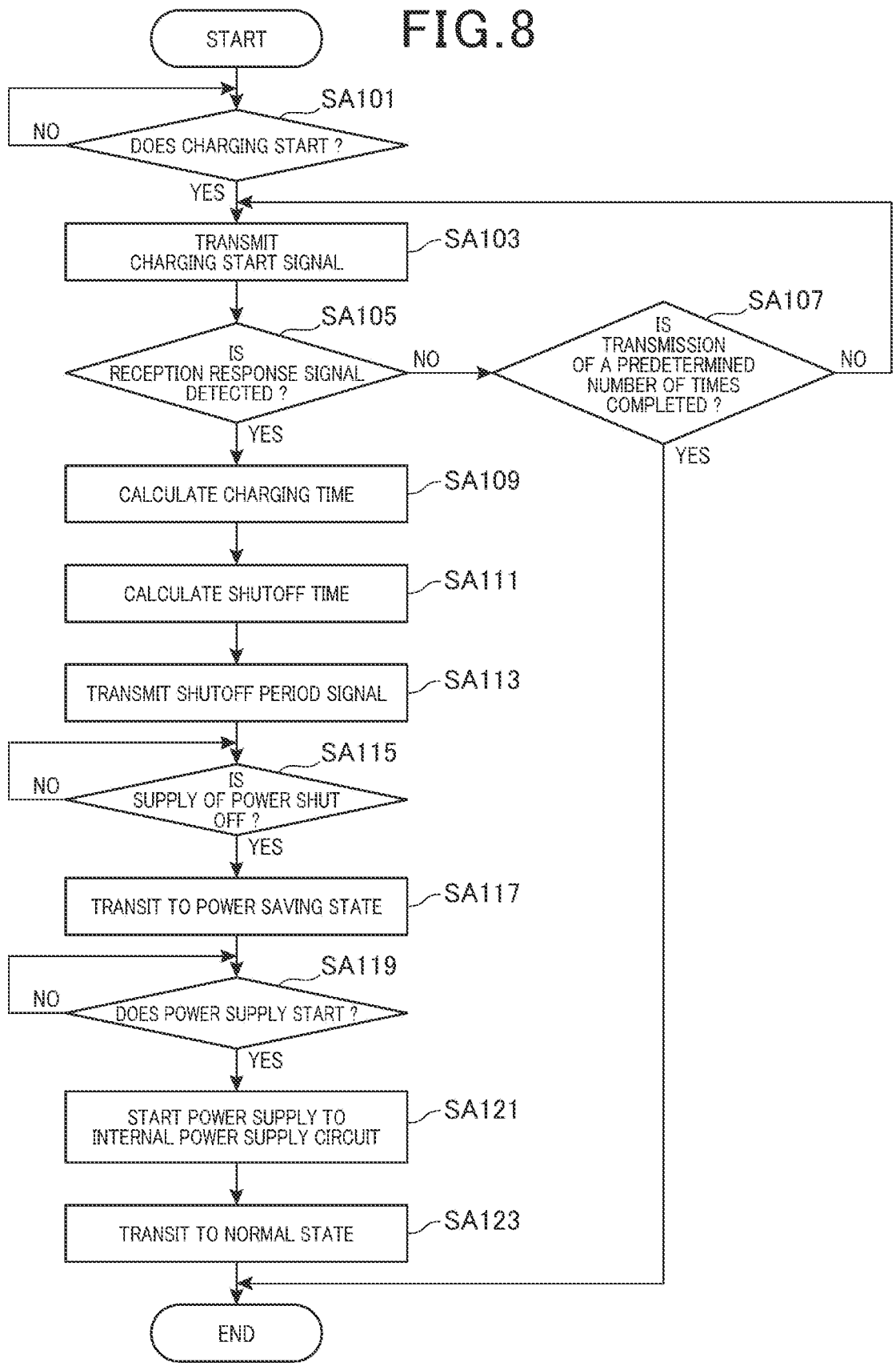
FIG. 8 is a flowchart showing an example of processing of the first controller.

FIG. 8 is a flowchart showing an example of the processing of the first controller 20.

Note that a case where each of the first switch 23, the second switch 24, and the third switch 312 is set to ON in an initial state of FIG. 8 will be described.

As shown in FIG. 8, in step SA101, the first controller 20 first determines whether charging of the battery 17 is started. For example, according to whether a charging current JB is flowing through the charging control IC, the first controller 20 determines whether the charging of the battery 17 is started.

When the first controller 20 determines that the charging of the battery 17 has not started (step SA101: NO), the processing is set to a standby state. When the first controller 20 determines that the charging of the battery 17 has started (step SA101: YES), the processing proceeds to step SA103.

Then, in step SA103, the first controller 20 transmits a charging start signal SGA to the second controller 311. The charging start signal SGA is a signal indicating that charging has started, and corresponds to, for example, the first pulse P1 shown in FIG. 6.

Next, in step SA105, the first controller 20 determines whether a reception response signal SGB has been detected. The reception response signal SGB is a signal indicating that the second controller 311 has received the charging start signal SGA, and corresponds to, for example, the second pulse P2 shown in FIG. 6.

When the first controller 20 determines that the reception response signal SGB has not been detected (step SA105: NO), the processing proceeds to step SA107.

In step SA107, the first controller 20 determines whether the charging start signal SGA has been transmitted to the second controller 311 at only a predetermined number of times. The predetermined number of times is, for example, three times.

When the first controller 20 determines that the charging start signal SGA has been transmitted to the second controller 311 at only the predetermined number of times (step SA107: YES), the processing terminates. When the first controller 20 determines that the charging start signal SGA has not been transmitted to the second controller 311 at only the predetermined number of times (step SA107: NO), the processing returns to step SA103.

When the first controller 20 determines that the reception response signal SGB has been detected (step SA105: YES), the processing proceeds to step SA109.

In step SA109, the first calculator 201 calculates the charging time TF required to complete the charging of the battery 17 based on the residual amount QR of the battery 17.

Next, in step SA111, the second calculator 202 calculates the shutoff period PC based on a charging time TF and a date and time when a lawn mowing work is started. The shutoff period PC indicates a period of time from a time point when charging is started until a time point when the shutoff of the supply power PS is released.

Next, the superimposing unit 203 superimposes the current JA indicating the period information DP on the charging current JB with the number of pulses of the charging current JB. As a result, the superimposing unit 203 transmits a shutoff period signal SGC to the second controller 311. The shutoff period signal SGC is a signal indicating the period information DP, and corresponds to, for example, the third pulse P3 to the fifth pulse P5 shown in FIG. 6.

Next, in step SA115, the transition unit 205 determines whether charging of the battery 17 has been completed and the supply power PS has been shut off. For example, the transition unit 205 determines based on the charging current JB whether the supply power PS has been shut off. Specifically, when the charging current JB is zero, the transition unit 205 determines that the supply power PS has been shut off.

When the transition unit 205 determines that the supply power PS is not shut off (step SA115: NO), the processing is set to a standby state. When the transition unit 205 determines that the supply power PS has been shut off (step SA115: YES), the processing proceeds to step SA117.

In step SA117, the transition unit 205 causes the lawn mower 2 to transition from the normal state to the power saving state. Specifically, the transition unit 205 sets the first switch 23 to OFF, and sets the second switch 24 to OFF.

Next, in step SA119, the internal power supply circuit 25 determines whether supply of power from the charging station 3 to the internal power supply circuit 25 is started.

When the internal power supply circuit 25 determines that the supply of power from the charging station 3 to the internal power supply circuit 25 has not been started (step SA119: NO), the processing is set to a standby state. When the internal power supply circuit 25 determines that the supply of power from the charging station 3 to the internal power supply circuit 25 is started (step SA119: YES), the processing proceeds to step SA121.

In step SA121, the internal power supply circuit 25 generates power for causing the first controller 20 to operate from power supplied from the charging station 3, and supplies the power to the first controller 20. The transition unit 205 starts to supply power from the battery 17 to the internal power supply circuit 25. Specifically, the transition unit 205 starts the supply of power from the battery 17 to the internal power supply circuit 25 by setting the second switch 24 to ON.

Next, in step SA123, the transition unit 205 causes the lawn mower 2 to transition from the power saving state to the normal state, and the processing terminates. Specifically, the transition unit 205 sets the first switch 23 to ON.

FIG. 9 is a flowchart showing an example of processing of the second controller 311.

Note that a case where each of the first switch 23, the second switch 24, and the third switch 312 is set to ON in an initial state of FIG. 9 will be described.

In step SB101, the second controller 311 first determines whether a connection with the lawn mower 2 has been detected. For example, by detecting electrical conduction at the connection unit 32, the second controller 311 determines whether the connection with the lawn mower 2 has been detected.

When the second controller 311 determines that the connection with the lawn mower 2 has not been detected (step SB101: NO), the processing is set to a standby state. When the second controller 311 determines that the connection with the lawn mower 2 has been detected (step SB101: YES), the processing proceeds to step SB103.

Next, in step SB103, the second controller 311 starts charging of the battery 17.

Next, in step SB105, the second controller 311 determines whether the charging start signal SGA has been detected. The charging start signal SGA indicates that the first controller 20 starts to transmit the period information DP to the second controller 311. The charging start signal SGA corresponds to, for example, the first pulse P1 in FIG. 6.

When the second controller 311 determines that the charging start signal SGA has not been detected (step SB105: NO), the processing is set to a standby state. When the second controller 311 determines that the charging start signal SGA has been detected (step SB105: NO), the processing proceeds to step SB107.

Then, in step SB107, the second controller 311 transmits the reception response signal SGB to the first controller 20. The reception response signal SGB indicates that the charging start signal SGA has been detected. Further, the reception response signal SGB corresponds to, for example, the second pulse P2 in FIG. 6.

Next, in step SB109, the information acquisition unit 311B determines whether the shutoff period signal SGC has been detected. The shutoff period signal SGC indicates the period information DP. The shutoff period signal SGC corresponds to, for example, the third pulse P3 to the fifth pulse P5 in FIG. 6.

When the information acquisition unit 311B determines that the shutoff period signal SGC has not been detected (step SB109: NO), the processing is set to a standby state. When the information acquisition unit 311B determines that the shutoff period signal SGC has been detected (step SB109: YES), the processing proceeds to step SB111.

Then, in step SB111, the information acquisition unit 311B acquires the period information DP based on a detection result of the current detector 311A. The period information DP defines the shutoff period PC of the supply power PS. The shutoff period PC indicates a period from a time point when charging is started until a time point when the shutoff of the supply power PS is released.

Next, in step SB113, the shutoff controller 311C starts counting of the shutoff period PC.

Next, in step SB115, the shutoff controller 311C determines whether the charging of the battery 17 has been completed.

When the shutoff controller 311C determines that the charging of the battery 17 has not been completed (step SB115: NO), the processing is set to a standby state. When the shutoff controller 311C determines that the charging of the battery 17 has been completed (step SB115: YES), the processing proceeds to step SB117.

In step SB117, the shutoff controller 311C shuts off the supply power PS. In other words, the shutoff controller 311C shuts off the supply of power from the charging station 3 to the battery 17 and the internal power supply circuit 25.

Next, in step SB119, the shutoff controller 311C determines whether the shutoff period PC has elapsed.

When the shutoff controller 311C determines that the shutoff period PC has not elapsed (step SB119: NO), the processing is set to a standby state. When the shutoff controller 311C determines that the shutoff period PC has elapsed (step SB119: YES), the processing proceeds to step SB121.

In step SB121, the shutoff controller 311C releases the shutoff of the supply power PS. In other words, the shutoff controller 311C starts to supply power from the charging station 3 to the battery 17 and the internal power supply circuit 25. Thereafter, the processing terminates.

Step SA113 in FIG. 8 corresponds to an example of "superimposing step". Step SB109 in FIG. 9 corresponds to an example of "current detection step". Step SB111 in FIG. 9 corresponds to an example of "information acquisition step". Step SB117 in FIG. 9 corresponds to an example of "shutoff step". Steps SB119 and SB121 in FIG. 9 correspond to an example of "release step".

5. Effect of Embodiment

As described above, in the present embodiment, the charging control system 100 includes the battery 17, and also includes the lawn mower 2 that performs a lawn mowing work while autonomously traveling, and the charging station 3 for charging the battery 17. The lawn mower 2 includes the superimposing unit 203 for superimposing, on the charging current JB, the current indicating period information DP for defining the shutoff period PC of the supply power PS to be supplied from the charging station 3. The charging station 3 includes the current detector 311A for detecting the charging current JB, the information acquisition unit 311B for acquiring the period information DP based on the detection result of the current detector 311A, and the shutoff controller 311C for shutting off the power supply PS. The shutoff controller 311C releases the shutoff of power supply to the lawn mower 2 based on the period information DP acquired by the information acquisition unit 311B.

In other words, the superimposing unit 203 superimposes, on the charging current JB, the current indicating the period information DP for defining the shutoff period PC of supply power, the current detector 311A detects the charging current JB, and the information acquisition unit 311B acquires the period information DP based on the detection result of the current detector 311A. Therefore, the period information DP can be transmitted from the lawn mower 2 to the charging station 3 with the charging current JB. Further, the shutoff controller 311C shuts off the supply power PS, and releases the shutoff of the supply power PS based on the period information DP acquired by the information acquisition unit 311B.

Accordingly, the power consumption of the lawn mower 2 can be reduced. For example, when charging has been completed, the shutoff controller 311C shuts off the supply power PS, and when the shutoff period PC has elapsed, the shutoff controller 311C releases the shutoff of the supply power PS. In this case, the power consumption of the lawn mower 2 can be effectively reduced.

Moreover, a control method for the charging station 3, the lawn mower 2, and the charging control system 100 according to the present embodiment can obtain the same effect as described above.

Further, the lawn mower 2 includes the first calculator 201 for calculating, based on the remaining amount of the battery 17, the charging time TF required until charging of the battery 17 is completed, and the second calculator for calculating the shutoff period PC based on the charging time TF and the date and time when the lawn mower work is started.

Therefore, an appropriate shutoff period PC can be calculated. Accordingly, the power consumption of the lawn mower 2 can be effectively reduced.

Further, the superimposing unit 203 superimposes the current indicating the period information DP on the charging current JB with at least one of the current value, the pulse width, and the number of pulses of the charging current JB.

Therefore, since the period information DP is represented by at least one of the current value, the pulse width, and the number of pulses of the charging current JB, the information acquisition unit 311B can easily acquire the period information DP based on the detection result of the current detector 311A.

The lawn mower 2 includes the regulation controller 204 for regulating the current value of the charging current JB. The superimposing unit 203 causes the regulation controller 204 to regulate the current value of the charging current JB, thereby superimposing the current indicating the period information DP on the charging current JB with at least one of the current value, the pulse width, and the number of pulses of the charging current JB.

Therefore, since the current indicating the period information DP is superimposed on the charging current JB by causing the regulation controller 204 to regulate the current value of the charging current JB, the current indicating the period information DP can be superimposed on the charging current JB with a simple configuration.

Further, when charging of the battery 17 has been completed, the shutoff controller 311C shuts off the supply power PS.

Accordingly, power consumption can be effectively reduced.

Further, when the shutoff period PC has elapsed, the shutoff controller 311C releases the shutoff of the supply power PS.

Therefore, it can be notified to the lawn mower 2 with a simple configuration that the shutoff period PC has elapsed. Therefore, the lawn mower 2 can be started up at an appropriate timing.

Further, the lawn mower 2 includes the transition unit 205 for causing the lawn mower 2 to transition from the normal state to the power saving state when the charging of the battery 17 has been completed.

Therefore, when the charging of the battery 17 has been completed, the lawn mower 2 is transitioned from the normal state to the power saving state. Therefore, the power consumption of the lawn mower 2 can be reduced.

Moreover, when the shutoff period PC has elapsed, the transition unit 205 causes the lawn mower 2 to transition from the power saving state to the normal state.

Accordingly, the lawn mower 2 is kept in a power saving state until the shutoff period PC has elapsed. Therefore, the power consumption of the lawn mower 2 can be reduced. Moreover, since the lawn mower 2 is transitioned from the power saving state to the normal state when the shutoff period PC has elapsed, the lawn mower 2 can be transitioned to a state in which it can operate at an appropriate timing.

The lawn mower 2 also includes the internal power supply circuit 25 for generating operating power for the lawn mower 2 based on stored power of the battery 17. The transition unit 205 shuts off the supply of power from the battery 17 to the internal power supply circuit 25 when the charging of the battery 17 has been completed.

Therefore, when the charging of the battery 17 has been completed, the power supply from the battery 17 to the internal power supply circuit 25 for generating the operating power of the lawn mower 2 is shut off, so that the consumption amount of power stored in the battery 17 can be reduced. Therefore, the power consumption of the lawn mower 2 can be reduced.

Further, the charging control system 100 is configured so that power can be supplied from the charging station 3 to the internal power supply circuit 25. When the supply of power from the charging station 3 to the internal power supply circuit 25 is started during the period when the supply of power from the battery 17 is shut off, the internal power supply circuit 25 generates power for causing the transition unit 205 to operate from the power supplied from the charging station 3.

Therefore, even during the period when the supply of power from the battery 17 to the internal power supply circuit 25 is shut off, the transition unit 205 can be caused to operate by the power supplied from the charging station 3. Accordingly, the transition unit 205 can be operated even during the period when power supply from the battery 17 to the internal power supply circuit 25 is shut off. As a result, it is possible to reduce the power consumption of the lawn mower 2 during the period when the power supply from the battery 17 to the internal power supply circuit 25 is shut off.

6. Other Embodiments

The present invention is not limited to the configuration of the embodiment described above, and may be implemented in various modes without departing from the subject matter of the invention.

For example, in the present embodiment, the "autonomous traveling work machine" is the robot lawn mower 2, but the present invention is not limited to this mode. The "autonomous traveling work machine" may perform predetermined work while traveling autonomously. For example, the "autonomous traveling work machine" may be a security robot that performs a monitoring work while autonomously traveling.

In the present embodiment, the "power saving state" is a so-called shutdown state, but the present invention is not limited to this mode. The "power saving state" may be a so-called sleep state. In this case, the configuration of the lawn mower 2 can be simplified. Specifically, the second switch 24 of the lawn mower 2 is unnecessary. Even in a state where the supply power PS is shut off, power is supplied from the battery 17 to the internal power supply circuit 25, so that the lawn mower 2 can be easily transitioned to the "normal state". As a result, the processing of the first controller 20 can be simplified.

In the present embodiment, the shutoff controller 311C shuts off the power supply to the lawn mower 2 from the time when charging of the battery 17 has been completed until the time when the shutoff period PC has elapsed, but the present invention is not limited to this mode.

The shutoff of power supply to the lawn mower 2 may be released based on the shutoff period PC.

For example, the power supply to the lawn mower 2 may be shut off after the amount of power stored in the battery 17 has reached a predetermined amount. The predetermined amount is set to, for example, 80% of the amount of stored power when fully charged. In this case, it is possible to effectively reduce the consumption of power supplied from the charging station 3 to the lawn mower 2. In this case, the first calculator 201 does not have to calculate the charging time TF. In this case, the second calculator 202 calculates the shutoff period PC based on the date and time when a lawn mowing work is started.

For example, "the date and time when the lawn mowing work is started" is stored in a memory of the first controller 20 of the lawn mower 2 by inputting of the user. For example, a working time zone for starting the lawn mowing work is stored for each day of the week in the memory. The working time zone may exist several times a day. The second calculator 202 may calculate, as the "shutoff period PC", the time from a "current time" to a "working time zone that will come next among a plurality of working time zones" stored in the memory.

Further, for example, the power supply to the lawn mower 2 may be shut off until a predetermined time before the shutoff period PC has elapsed. The predetermined time is, for example, the time required for starting the lawn mower 2. In this case, the lawn mower 2 can be operated immediately when the shutoff period PC has elapsed.

At least a part of the functional blocks shown in FIGS. 2 to 4 and the like may be configured to be implemented by hardware or to be implemented by cooperation of hardware and software. The present invention is not limited to a configuration in which independent hardware resources are arranged as shown in the figures.

The control program executed by each of the first controller 20 and the second controller 311 may be stored in another storage unit in the memory. Moreover, each of the first controller 20 and the second controller 311 may be configured to acquire a control program stored in an external device via the communication unit or the like and execute the control program.

The charging current JB shown in FIG. 6 is merely an example, and is not limited to this example. For example, the shutoff period signal SGC corresponds to the third pulse P3 to the fifth pulse P5 shown in FIG. 6, but the shutoff period signal SGC may be a signal indicating the period information DP. Further, the reception response signal SGB corresponds to the second pulse P2 shown in FIG. 6, but the reception response signal SGB may be a signal indicating that the second controller 311 has received the charging start signal.

The timing chart shown in FIG. 7 is merely an example, and is not limited to this example. For example, in FIG. 7, the first switch 23 is set to OFF, the second switch 24 is set to OFF, and the third switch 312 is set to OFF at the time point TB to the time point TC, but the present invention is not limited to this mode. The first switch 23 may be set to OFF, the third switch 312 may be set to OFF, and the second switch 24 may be set to OFF.

The processing units of the flowcharts shown in FIGS. 8 and 9 are obtained by dividing the processing of each of the first controller 20 and the second controller 311 according to main processing contents in order to facilitate understanding of the processing of each of the first controller 20 and the second controller 311. The embodiments are not limited by a dividing manner and names of the processing units shown in the flowcharts shown in FIGS. 8 and 9. Further, the processing of the first controller 20 and the second controller 311 may be divided into more processing units according to the processing contents, or may be divided so that one processing unit includes more processing pieces. Further, the processing orders of the above-described flowcharts are not limited to the examples shown in the figures.

Further, when the first calculator 201 does not calculate the charging time TF, the step SA109 in FIG. 8 and the step SB105 in FIG. 9 are unnecessary. Further, in FIG. 8, the processing of step SA103 to step SA107 may be executed after step SA113. The processing of step SB107 in FIG. 9 may be executed after step SB111.

REFERENCE SIGNS LIST 100 charging control system
2 robot lawn mower, lawn mower (autonomous traveling work machine)
17 battery
20 first controller
201 first calculator
202 second calculator
203 superimposing unit
204 regulation controller
205 transition unit
22 charging control IC
23 first switch
24 second switch
25 internal power supply circuit
3 charging station
31 control board
311 second controller
311A current detector
311B information acquisition unit
311C shutoff controller
312 third switch (shutoff unit)
32 connection unit
4 conversion device
42 AC/DC adapter
DP period information
JB charging current
PC shutoff period
PS supply power
SGA charging start signal
SGB reception response signal
SGC shutoff period signal
TF charging time
VB battery voltage

The invention claimed is:

1. A charging control system comprising:
an autonomous traveling work machine that includes a battery and performs predetermined work while traveling autonomously; and
a charging station for charging the battery,
wherein the autonomous traveling work machine comprises a first controller comprising a first processor configured to function as a superimposing unit by which a current indicating period information defining a shutoff period of supply power to be supplied from the charging station is superimposed on a charging current, and
wherein the charging station comprises a shutoff switch and a second controller, the shutoff switch being for shutting off the supply power, and the second controller comprising a second processor configured to function as:
a current detector for detecting the charging current;
an information acquisition unit for acquiring the period information based on a detection result of the current detector; and
a shutoff controller for controlling an operation of the shutoff switch, the shutoff controller releasing the shutoff of the supply power based on the period information acquired by the information acquisition unit.

2. The charging control system according to claim 1, wherein the first processor of the first controller of the autonomous traveling work machine is further configured to function as a calculator for calculating the shutoff period based on a current time and a date and time when the predetermined work is started.

3. The charging control system according to claim 1, wherein the first processor of the first controller of the autonomous traveling work machine is further configured to function as:
a first calculator for calculating, based on a remaining amount of the battery, a charging time required until charging of the battery is completed; and a second calculator for calculating the shutoff period based on the charging time and a date and time when the predetermined work is started.

4. The charging control system according to claim 1, wherein the superimposing unit superimposes the current indicating the period information on the charging current with at least one of a current value, a pulse width, and a number of pulses of the charging current.

5. The charging control system according to claim 4, wherein the first processor of the first controller of the autonomous traveling work machine is further configured to function as a regulation controller for regulating the current value of the charging current, and the superimposing unit causes the regulation controller to regulate the current value of the charging current, thereby superimposing the current indicating the period information on the charging current with at least one of the current value, the pulse width, and the number of pulses of the charging current.

6. The charging control system according to claim 1, wherein when the charging of the battery is completed, the shutoff controller shuts off the supply power.

7. The charging control system according to claim 1, wherein when the shutoff period has elapsed, the shutoff controller releases the shutoff of the supply power.

8. The charging control system according to claim 1, wherein the first processor of the first controller of the autonomous traveling work machine is further configured to function as a transition unit for shifting the autonomous traveling work machine from a normal state to a power saving state when the charging of the battery is completed.

9. The charging control system according to claim 8, wherein when the shutoff period has elapsed, the transition unit shifts the autonomous traveling work machine from the power saving state to the normal state.

10. The charging control system according to claim 8, wherein the autonomous traveling work machine comprises an internal power supply circuit for generating operation power for the autonomous traveling work machine based on stored power of the battery, and the transition unit shuts off supply of power from the battery to the internal power supply circuit when the charging of the battery is completed.

11. The charging control system according to claim 10, wherein the charging control system is configured so that power can be supplied from the charging station to the internal power supply circuit, and when supply of power from the charging station to the internal power supply circuit is started during a period of time when supply of power from the battery is shut off, the internal power supply circuit generates power for operating the transition unit with power supplied from the charging station.

12. A charging station for charging a battery of an autonomous traveling work machine that performs predetermined work while traveling autonomously, comprising a shutoff switch and a controller, the shutoff switch being for shutting off the supply power, and the controller comprising a processor configured to function as:
a current detector for detecting a charging current on which a signal indicating period information for defining a shutoff period of supply power to be supplied to the autonomous traveling work machine is superimposed by the autonomous traveling work machine;
an information acquisition unit for acquiring the period information based on a detection result of the current detector; and
a shutoff controller for controlling an operation of the shutoff unit, wherein the shutoff controller releases the shutoff of the supply power based on the period information acquired by the information acquisition unit.

13. An autonomous traveling work machine that includes a battery and performs predetermined work while traveling autonomously, comprising a controller comprising a processor configured to function as:
a superimposing unit by which a signal indicating period information for defining a shutoff period of supply power to be supplied from a charging station is superimposed on a charging current, wherein the charging station detects the charging current, acquires the period information based on a detection result of the charging current, and releases shutoff of the supply power based on the period information.

14. A charging control system control method for a charging control system including an autonomous traveling work machine that includes a battery and performs predetermined work while traveling autonomously, and a charging station for charging the battery, the method comprising:
a superimposing step in which the autonomous traveling work machine superimposes, on a charging current, a signal indicating period information for defining a shutoff period of supply power to be supplied from the charging station;
a current detection step in which the charging station detects the charging current;
an information acquisition step in which the charging station acquires the period information based on a detection result in the current detection step;
a shutoff step in which the charging station shuts off the supply power; and
a release step in which the charging station releases shutoff of the supply power based on the period information acquired in the information acquisition step.

* * * * *